3,809,730
METHOXYMETHYLATION OF 3-(DIALKYL-PHOSPHONO) PROPIONAMIDES

John Henry Polevy and John Justin Randall, Cumberland, R.I., assignors to Synthron Chemicals, Inc., Pawtucket, R.I.
No Drawing. Filed Aug. 14, 1972, Ser. No. 280,331
Int. Cl. C07f 9/40
U.S. Cl. 260—968                                                    9 Claims

ABSTRACT OF THE DISCLOSURE 3-(dialkylphosphono) propionamides in which the alkyl groups have from 1 to 2 carbon atoms are heated with at least equimolar proportions of formaldehyde and methanol under strongly acidic conditions, and water together with excess formaldehyde and methanol are removed at reduced pressure to form a product which is primarily N - methoxymethyl - 3 - (dialkylphosphono) propionamide useful as a flame retardant agent.

---

This invention relates to a method of methoxymethylating 3-(dialkylphosphono) propionamides and pertains more specifically to reacting such amides with formaldehyde and methanol under strongly acidic conditions.

It has long been common practice to carry out hydroxymethylation of a variety of amides by reacting with formaldehyde under alkaline conditions. It has also been proposed to hydroxymethylate 3-(dialkylphosphono) propionamides under alkaline conditions and then to react the product with methanol under acidic conditions to form methoxymethylated and other products, as in U.S. Pat. Nos. 3,374,292 and 3,658,952. Such a two-stage procedure is time consuming and expensive, and the products, useful in impregnating cellulosic fabrics to render them flame-resistant, exhibit undesirable instability and a tendency to produce smoke and fumes when cured on fabric with an aminoplast.

The present invention provides a method for methoxymethylating a 3-(dialkylphosphono) propionamide in which the alkyl groups contain from 1 to 2 carbon atoms which comprises providing a composition containing one mole of said propionamide with at least one mole of formaldehyde and at least one mole of methanol and sufficient strong acid to provide a pH less than 5.5 measured in a mixture containing equal volumes of said composition and water, heating said composition at a temperature below 160° C., then removing water and unreacted formaldehyde and methanol. The product, in the form of a transparent viscous liquid, is primarily N-methoxymethyl-3 - (dialkylphosphono) propionamide, but a substantial quantity of a condensation product believed to be O-bis-[N-methylene-3-(dialkylphosphono) propionamide] is also present. The product provides excellent flame resistance when applied to cellulosic textile fabrics along with an aminoplast and exhibits excellent stability during cure as evidenced by the decreased amount of smoking and of irritant vapors produced during the cure.

The method of the present invention works equally well with 3-(dimethylphosphono) propionamide and with 3-(diethylphosphono) propionamide. Because the amide is the most expensive of the reagents, it is desirable, to insure that the reaction goes to completion, to employ an excess of formaldehyde and of methanol above the equimolar quantities required for the reaction. An excess of these reagents also accelerates the reaction. In general, at least 1.5 moles each of formaldehyde and of methanol for each mole of amide is preferred. While there is no theoretical limit to the amount of the excess of these reagents, it is very desirable that the product, in order to be of maximum utility as a flame resistant agent, contain no more than about 3% by weight of free formaldehyde. The removal of unreacted formaldehyde from the composition adds to the cost of the method so that as a practical matter it is desirable to use no more than about 3 moles of formaldehyde for each mole of amide. Similarly, the excess methanol which is removed along with the excess formaldehyde adds to the cost so that it is desirable to use no more than about 3 moles of this reagent for each mole of amide. For best results, the molar quantity of methanol is at least equal to the molar quantity of formaldehyde initially present in the composition.

If desired, there may be used in place of formaldehyde its equivalent paraformaldehyde or other suitable source of formaldehyde. A convenient form of reagent is the material available commercially under the name Methyl Formcell consisting of a methanol solution containing about 55% by weight formaldehyde and about 10% by weight of water. While water may be present in the composition during the reaction and is indeed formed as a by-product of the reaction, it is desirable to minimize the quantity of water present initially in order to have the reaction proceed as rapidly as possible.

The amide starting material, which may be prepared as described in U.S. Pat. Nos. 2,754,319 and 2,754,320 as well as by Putovick et al., Bull. Acad. Sci. U.S.S.R. Div. Cen. Sci., 1952, 657–660, may be used either in the form of a solution or dispersion in methanol without separation from the reaction mixture in which it is prepared, or if desired, a purified and recrystallized form of the amide can be used.

Any suitable acid can be used in the method, such as nitric, hydrochloric, sulfuric, phosphoric, benzene sulfonic, p-toluene sulfonic, acetic and the like, in an amount sufficient to provide the specified pH. The pH of the composition can best be measured with a conventional pH meter by first mixing the composition with an equal volume of water, and the term pH as used herein means the value determined in this manner. Surprisingly, the lower the pH, the faster the reaction proceeds, all other things being equal, and it is possible to carry out the reaction at pH values as low as 1.0 or even lower. However, the reaction mixture and the products tend to become yellow in color at low pH values, and in order to avoid this, it is desirable to carry out the reaction at a pH no lower than about 2.0. The pH of the composition decreases during the course of the reaction, an initial pH of 5 dropping, for example, to about 3 during the course of the reaction. It is essential to have the initial pH of the composition no higher than 5.5 in order to have the reaction rate high enough to be of practical importance and preferably the initial pH is no higher than 5.0 to obtain reasonably fast reaction. Optimum speed of reaction and freedom from yellow discoloration are achieved when the pH remains at a value from 2.0 to 3.0 throughout the course of the reaction.

In preparing the reaction composition, it is desirable that the acid be mixed with the amide either before or together with the formaldehyde in order to avoid undesired reactions leading to the formation of different products.

In order to have the reaction rate high enough to be of practical importance, the composition must be heated; while any degree of heating produces some acceleration of the reaction rate, it is usually desirable to employ temperatures of 50° C. or higher. At a temperature of about 160° C., decomposition of the product occurs; this imposes an upper limit on the temperature to be employed; furthermore, since the boiling point of the composition is about 80–85° C. at normal pressure, an elevated pressure must be used at higher temperatures. It is usually most convenient simply to heat the composition to reflux temperature at atmospheric pressure and to maintain it at that temperature, which drops a few degrees centigrade during the course of the reaction as the formaldehyde is used up.

Completion of the reaction can be determined in several ways. The quantity of free formaldehyde in the composition can be determined by conventional titration procedures; the reaction can be considered complete when this test shows that the molar quantity of formaldehyde consumed is equal to the molar quantity of amide initially present. It is also possible to determine the infrared absorption spectrum of the composition; when the absorption peak characteristic of the amide group at 6.12 microns has substantially disappeared and has been replaced by the peak at 6.43 microns characteristic of mono-substituted amides, the reaction can be considered complete. When all of the reagents are present in equimolar portions, the pH is 2–3, and the composition is heated at reflux temperature, the reaction is complete in about 5–6 hours. When the molar ratio of formaldehyde and of methanol to the amide is 2:1 and conditions are otherwise the same as above, the reaction is complete in about 1–2 hours.

When the reaction has thus been determined to be complete, the water which is formed as a byproduct is removed together with the excess of formaldehyde and of methanol. While the acid is preferably neutralized before this removal step in order to obtain optimum results, neutralization is not absolutely essential. Any conventional alkaline material which does not react with the product to form a water-insoluble precipitate, such as sodium or potassium hydroxide or other alkali metal hydroxide, can be used in the neutralization step, the pH being raised to about 7–8.

Removal of the water and excess formaldehyde and methanol is most conveniently accomplished by a vacuum stripping procedure, i.e., by evaporation or distillation of these materials from the composition by heating at reduced pressure. Because decomposition of the product occurs at an appreciable rate at a temperature of 160° C., the temperature should not be permitted to exceed this value for most satisfactory results; preferably, the temperature should not exceed 120° C. At temperatures below about 100° C., the rate of removal of formaldehyde from the composition is rather slow, so that as a practical matter, a temperature of 100° to 120° C. is preferred for the removal step. In order to remove the formaldehyde at a reasonably rapid rate, the pressure should be maintained below about 250 millimeters of mercury. The removal procedure is continued until the product contains no more than about 3% by weight of free formaldehyde, preferably less than 2% by weight. The removal of water and of methanol is not important so far as the intended use of the product is concerned; indeed, it may be desirable to dilute the product with water in order to lower its viscosity and facilitate its use in impregnating fabrics.

The following specific examples are intended to illustrate more fully the nature of the method of the present invention without acting as a limitation upon its scope.

EXAMPLE 1

To a solution of 2190 g. (12.1 moles) of recrystallized 3-(dimethylphosphono) propionamide in 700 g. (22 moles) of methanol is added 13.5 g. of 70% aqueous nitric acid followed by 1342 g. of Methyl Formcell consisting of a solution of 735 g. (24.5 moles) formaldehyde in solution with 467 g. (14.6 moles) methanol and 140 g. water. The pH of this composition is adjusted with nitric acid if necessary so that a mixture of the composition with an equal volume of water gives a pH of 2.6–2.8. The temperature of the solution is raised to reflux and held for 2.5 hours or, alternatively, until the theoretical (363 g., 12.1 moles) amount of formaldehyde is consumed, or until the amide absorption at 6.12 microns in the infrared has substantially disappeared and has been replaced by the mono-substituted amide peak at 6.43 microns, then cooled and the pH adjusted with 50% aqueous sodium hydroxide so that a mixture with an equal volume of water gives a pH of 7–8. The reaction mixture is then stripped of the water, excess methanol, and most of the formaldehyde under full aspirator vacuum at a temperature not exceeding 110° C. The yield is about 2700 g. of a clear viscous colorless product containing 1–2% uncombined formaldehyde.

The product is further characterized by its NMR spectrum and by its mass spectrum which gives strong confirmatory ion peaks, indicating that it contains about 70% N-methoxymethyl-3-(dimethylphosphono) propionamide with the balance a condensate believed to be O-bis-[N-methylene-3-(dimethylphosphono) propionamide].

The product when padded on cotton textile fabrics together with an aminoplast in the usual manner and cured by heating provides excellent flame resistance. Little or no smoke or fumes are produced during the curing process.

EXAMPLE 2

There is added to 2090 g. (10 moles) of crude 3-(diethylphosphono) propionamide in the form of an oily liquid sufficient 70% aqueous nitric acid so that when tested on a pH meter the pH is about 5. There are then mixed with it 1091 g. of Methyl Formcell (20 moles formaldehyde and 12 moles ethanol) and 254.5 g. of methanol (8 moles). The pH of this mixture, as measured on a pH meter, is then adjusted to 5.45 by means of additional nitric acid. A portion of the mixture, when mixed with an equal volume of water, exhibits a pH of 3.60. The mixture is then heated to the reflux temperature and maintained at that temperature for four hours. Examination of the infrared absorption of a sample at that point shows that the amide absorption band at 6.12 microns has disappeared and has been replaced by the mono-substituted amide peak at 6.43 microns. The pH of the mixture, measured directly, is at this point 4.10 and when mixed with an equal volume of water is 3.00. The reaction mixture is then stripped of the water, excess methanol and formaldehyde under aspirator vacuum at a temperature of 110° C. as in Example 1. The yield is about 2450 g. of a viscous product corresponding to that of Example 1 except that it contains (diethylphosphono) groups in place of (dimethylphosphono). It is similar to that of Example 1 in characteristics and properties but displays increased stability and contains only 0.6% uncombined formaldehyde.

The product provides excellent flame resistance for cotton when applied as described in Example 1.

What is claimed is:

1. The method of methoxymethylating a 3-(dialkylphosphono) propionamide in which the alkyl groups contain from 1 to 2 carbon atoms which comprises providing a composition containing one mole of said propionamide with at least 1 mole of formaldehyde and at least one mole of methanol and sufficient acid to provide a pH less than 5.5 measured in a mixture containing equal volumes of said composition and water, heating said composition at a temperature below 160° C., then removing water and unreacted formaldehyde and methanol.

2. The method as claimed in claim 1 in which the molar quantity of methanol is at least equal to the molar quantity of formaldehyde.

3. The method as claimed in claim 1 in which the quantity of formaldehyde is from 1.5 to 3 moles.

4. The method as claimed in claim 1 in which the acid provides a pH from 2 to 3.

5. The method as claimed in claim 1 in which the heating is carried out at reflux temperature.

6. The method as claimed in claim 3 in which the heating is continued until one mole of formaldehyde has reacted.

7. The method as claimed in claim 1 in which the quantity of formaldehyde is from 1.5 to 3 moles, the molar quantity of methanol is at least equal to the molar quantity of formaldehyde, the strong acid provides a pH from 2 to 3, and the heating is carried out at reflux temperature and is continued for at least one hour.

8. The method as claimed in claim 7 in which the acid is neutralized before the removal step.

9. The method as claimed in claim 7 in which the water, formaldehyde and methanol are removed by heating the composition at reduced pressure at a temperature from 100° to 120° C.

References Cited
UNITED STATES PATENTS

| | | | |
|---|---|---|---|
| 3,374,292 | 3/1968 | Zahir | 260—943 |
| 3,658,952 | 4/1972 | Nachbur | 260—943 X |

LORRAINE A. WEINBERGER, Primary Examiner

R. L. RAYMOND, Assistant Examiner

U.S. Cl. X.R.

260—943